US009853939B1

(12) United States Patent
Chen et al.

(10) Patent No.: US 9,853,939 B1
(45) Date of Patent: Dec. 26, 2017

(54) APPARATUSES AND METHODS FOR IDENTIFYING MOBILE ACCESS POINTS (APS) IN MOBILE POSITIONING SYSTEMS

(71) Applicant: AthenTek Incorporated, Taipei (TW)

(72) Inventors: Chun-Nan Chen, Taipei (TW); Ivy H. Tseng, Taipei (TW)

(73) Assignee: HOME INTELLIGENCE CO., LTD., Taipei (TW)

( * ) Notice: Subject to any disclaimer, the term of this patent is extended or adjusted under 35 U.S.C. 154(b) by 0 days.

(21) Appl. No.: 15/462,711

(22) Filed: Mar. 17, 2017

(51) Int. Cl.
*H04W 24/00* (2009.01)
*H04L 29/12* (2006.01)
*H04W 64/00* (2009.01)
*H04W 84/00* (2009.01)

(52) U.S. Cl.
CPC ........... *H04L 61/35* (2013.01); *H04W 64/006* (2013.01); *H04L 61/6022* (2013.01); *H04L 61/6095* (2013.01); *H04W 84/005* (2013.01)

(58) Field of Classification Search
CPC ....... H04W 4/02; H04W 64/00; H04W 88/08; H04W 4/023; H04W 84/045; H04W 8/26; H04W 88/16; H04W 4/021; H04W 48/20; H04W 4/001; H04W 48/04; H04W 4/04; H04W 64/003; H04W 4/025; H04W 72/04; H04W 92/06; H04W 24/02; H04W 48/18; H04W 16/18; H04W 36/0061; H04W 36/0083; H04W 92/02; H04W 92/24; H04W 16/00; H04W 76/021; H04W 60/06; H04W 80/04; H04W 88/005; H04W 88/182; H04W 8/30; H04W 92/12; H04W 4/027; H04W 4/046; H04W 36/32; H04W 52/0254; H04W 84/005; H04W 88/10; H04W 28/0226; H04W 28/021; H04W 36/08; H04W 36/14; H04L 67/18; H04L 27/26; H04L 65/1069; H04L 67/26; H04L 63/164; H04L 1/1861; H04L 5/0055; H04L 65/04; H04M 2250/12; H04M 1/72569; H04M 1/72522; H04M 1/72572
See application file for complete search history.

(56) References Cited

U.S. PATENT DOCUMENTS

| | | | |
|---|---|---|---|
| 2012/0149415 A1* | 6/2012 | Valaee | H04W 64/00 455/507 |
| 2014/0206379 A1* | 7/2014 | Mayor | H04W 64/006 455/456.1 |
| 2014/0211691 A1* | 7/2014 | Emadzadeh | H04W 64/00 370/328 |
| 2016/0302033 A1* | 10/2016 | Cardno | H04W 40/244 |

* cited by examiner

Primary Examiner — Nimesh Patel (57) ABSTRACT

A computer system including a storage device and a controller is provided. The storage device is configured to store Service Set Identifiers (SSIDs), location information, and Media Access Control (MAC) addresses of a plurality of Access Points (APs). The controller is configured to determine a group of APs among the APs, whose MAC addresses are within a MAC address block, determine a first number of the group of APs whose SSIDs match one or more of a plurality of predetermined naming patterns or whose location information indicates a location change across a predetermined distance, determine whether a ratio of the first number to a total number of the group of APs exceeds a predetermined threshold, and classify the APs in the group as mobile APs when the ratio exceeds the predetermined threshold.

21 Claims, 5 Drawing Sheets

| Entry No. | SSID | MAC addr. | Location | Dictionary-based mobile flag | Geographic-based mobile flag | Mobile-block flag |
|---|---|---|---|---|---|---|
| 1 | PCCW | 00:a0:cc:23:af:4a | (44.9336, -93.2547) | ✗ | ✗ | ✗ |
| 2 | Y5ZONE | 08:00:28:63:5b:2c | (44.934, -93.2545) | ✗ | ✓ | ✓ |
| 3 | MyiPhone | 08:00:28:63:5a:e1 | (44.932, -93.2555) | ✓ | ✗ | ✓ |
| 4 | CUguest | 08:00:28:63:50:41 | (44.933, -93.2552) | ✗ | ✗ | ✓ |
| ... | | | | | | |
| N | | | | | | |

APPARATUSES AND METHODS FOR IDENTIFYING MOBILE ACCESS POINTS (APS) IN MOBILE POSITIONING SYSTEMS

BACKGROUND OF THE APPLICATION

Field of the Application

The application relates generally to mobile positioning techniques, and more particularly, to apparatuses and methods for identifying mobile Access Points (APs) in mobile positioning systems.

Description of the Related Art

With with rapid development of mobile device and mobile application industries, there has been a growing demand for users to continuously and accurately know the geographic location of their mobile devices. For example, mobile devices attached to pets, children, or the elderly allow their loved ones to keep track of them via mobile positioning techniques. Two ways to estimate the geographic location of a mobile device are using a wireless positioning network, such as the Global Positioning System (GPS) or a cell tower system, or using a database of wireless beacons and determining position using this database.

With the first technique, continuously obtaining signals from a satellite network or cellular network may be difficult for the mobile device. Such difficulties commonly arise in enclosed, confined areas, such as tunnels, or areas with a large concentration of tall buildings.

With the second technique, the creation of a database of wireless beacons is required, so that a mobile device may infer its location by reference to the detected wireless beacons, e.g., Wi-Fi beacons, which are already recorded in the database. However, the accuracy of the location inference may drop greatly when the detected beacon is a mobile beacon, i.e., the location of the beacon may vary and may not be the same as the location stored in the database. That is, the location inferred by reference to such beacons will be erroneous. Therefore, it is desirable to remove mobile beacons from the database used by mobile devices for location inference.

BRIEF SUMMARY OF THE APPLICATION

In a first aspect of the application, a computer system comprising a storage device and a controller is provided. The storage device is configured to store Service Set Identifiers (SSIDs), location information, and Media Access Control (MAC) addresses of a plurality of Access Points (APs). The controller is configured to determine a group of APs among the APs, whose MAC addresses are within a MAC address block, determine a first number of the group of APs whose SSIDs match one or more of a plurality of predetermined naming patterns or whose location information indicates a location change across a predetermined distance, determine whether a ratio of the first number to a total number of the group of APs exceeds a predetermined threshold, and classify the APs in the group as mobile APs when the ratio exceeds the predetermined threshold.

In a second aspect of the application, a method for a mobile positioning system to identify mobile APs is provided. The method comprises the steps of: determining a group of APs whose MAC addresses are within a MAC address block; determining a first number of the group of APs whose SSIDs match one or more of a plurality of predetermined naming patterns or whose location information indicates a location change across a predetermined distance; determining whether a ratio of the first number to a total number of the group of APs exceeds a predetermined threshold; and classifying the APs in the group as mobile APs when the ratio exceeds the predetermined threshold.

In a third aspect of the application, a product comprising one or more computer readable non-transitory storage media comprising computer-executable instructions is provided. The computer-executable instructions, when executed by at least one processor logic, enable the at least one processor logic to: determine a group of APs whose MAC addresses are within a MAC address block; determine a first number of the group of APs whose SSIDs match one or more of a plurality of predetermined naming patterns or whose location information indicates a location change across a predetermined distance; determine whether a ratio of the first number to a total number of the group of APs exceeds a predetermined threshold; and classify the APs in the group as mobile APs when the ratio exceeds the predetermined threshold.

Other aspects and features of the application will become apparent to those with ordinary skill in the art upon review of the following descriptions of specific embodiments of the computer systems and methods for a mobile positioning system to identify mobile APs.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. Other embodiments may incorporate structural, logical, electrical, process, and other changes. Portions and features of some embodiments may be included in, or substituted for, those of other embodiments.

Figure 1:
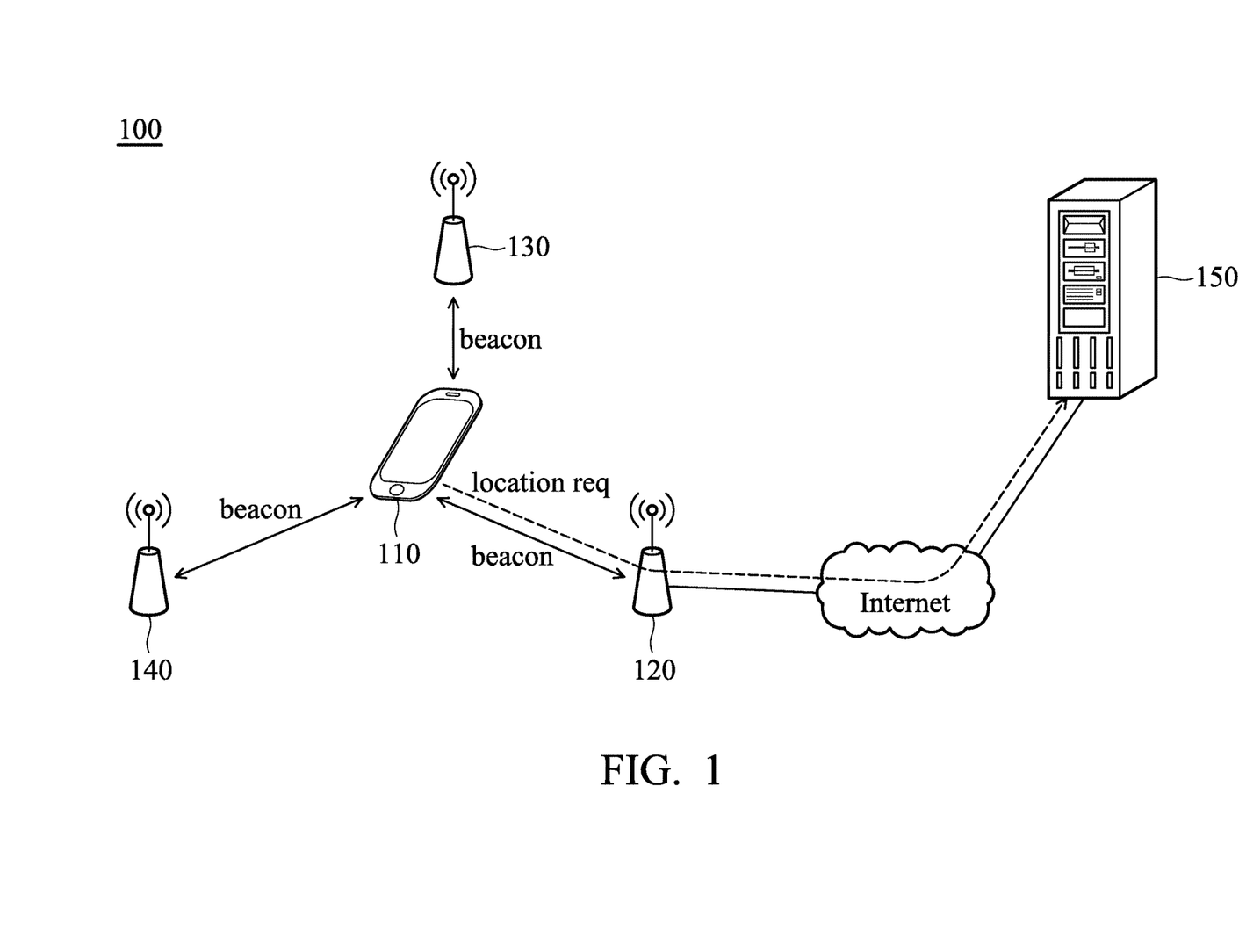
FIG. 1 is a schematic diagram illustrating a wireless communication environment according to an embodiment of the application.

FIG. 1 is a schematic diagram illustrating a wireless communication environment according to an embodiment of the application. The wireless communication environment 100 includes a mobile device 110, three Access Points (APs) 120 to 140, and a mobile positioning system 150. The mobile device 110 may be a feature phone, a smartphone, a panel Personal Computer (PC), a laptop computer, or any computing device supporting the wireless technology utilized by the APs 120 to 140. The mobile device 110 is located within the communication range to the APs 120 to 140, and is able to communicate wirelessly with the APs 120 to 140 using a wireless technology, such as the Wi-Fi technology.

Each of the APs 120 to 140 is a networking hardware device which may be mobile or fixed to a physical location.

The mobile device 110 scans for nearby APs (i.e., APs 120 to 140) and receives wireless beacons from the nearby APs, wherein the wireless beacons include identification information, e.g., Service Set Identifiers (SSIDs), and Media Access Control (MAC) addresses of the APs 120 to 140.

In addition, the mobile device 110 may send a location request to the mobile positioning system 150 via the AP 120 with which the mobile device 110 is currently associated, wherein the AP 120 is connected to the mobile positioning system 150 via the Internet or any wired/wireless network. The mobile positioning system 150 may maintain a database storing known APs and their corresponding location information. The location request is used to query location information of the mobile device 110, and may include the detected APs for the mobile positioning system 150 to infer the location of the mobile device 110.

Figure 2:
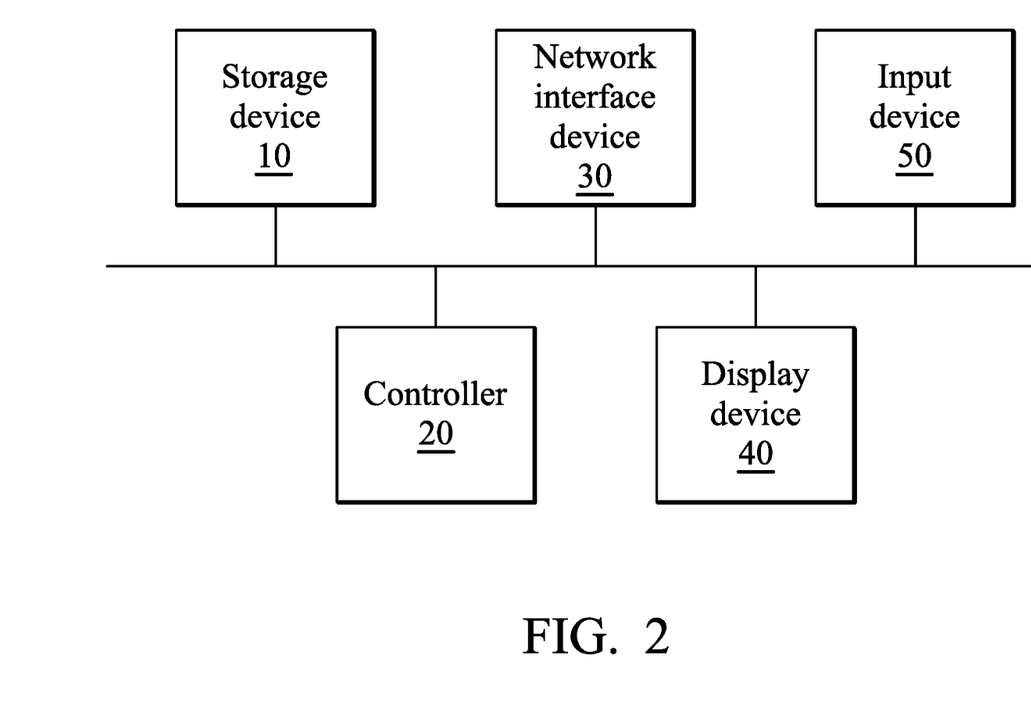
FIG. 2 is a block diagram illustrating the mobile positioning system 150 according to an embodiment of the application.

FIG. 2 is a block diagram illustrating the mobile positioning system 150 according to an embodiment of the application. The mobile positioning system 150 may be a computer system which includes a storage device 10, a controller 20, a network interface device 30, a display device 40, and an input device 50, at least some of which may communicate with others via an internal link (e.g., a system bus).

The storage device 10 consists of one or more computer-readable non-transitory storage media, including a memory, such as a FLASH memory or a Non-volatile Random Access Memory (NVRAM), or a magnetic storage device, such as a hard disk or a magnetic tape, or an optical disc, or any combination thereof for storing a database of APs and their corresponding location information, and storing computer-executable instructions or program code of communication protocols, applications, or the method of the present application.

The controller 20 may be a general-purpose processor, Micro-Control Unit (MCU), Digital Signal Processor (DSP), Application Processor (AP), or the like, which includes various circuits and/or processor logic for providing the function of data processing and computing, maintaining the database in the storage device 10, controlling the network interface device 30 for communications with APs, sending a series of frame data (e.g. representing text messages, graphics, images, etc.) to the display device 40, and receiving signals from the input device 50. In particular, the controller 20 coordinates the aforementioned operations of the storage device 10, the network interface device 30, the display device 40, and the input device 50 for performing the method of the present application.

As will be appreciated by persons skilled in the art, the circuits will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The network interface device 30 may include one or more physical jacks (e.g., Ethernet, coaxial, or phone jacks) or one or more antennas to connect to a public network (e.g., the Internet) and/or a private network. In an example, the network interface device 30 may include a plurality of antennas to wirelessly communicate using at least one of the Single-Input Multiple-Output (SIMO), Multiple-Input Multiple-Output (MIMO), or Multiple-Input Single-Output (MISO) techniques.

The display device 40 may be a Liquid-Crystal Display (LCD), Light-Emitting Diode (LED) display, or Electronic Paper Display (EPD), etc., for providing a display function. Alternatively, the display device 40 may further include one or more touch sensors disposed thereon or thereunder for sensing touches, contacts, or approximations of objects, such as fingers or styluses.

The input device 50 may include one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application. For example, the mobile device 110 may include more components, e.g., a wireless transceiver, to support wireless technologies, such as the Wi-Fi technology, the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time- Division LTE (TD-LTE) technology, and LTE-Advanced (LTE-A) technology, etc.

A wireless transceiver generally includes a baseband processing device, a Radio Frequency (RF) device, and an antenna. The baseband processing device may contain multiple hardware components to perform baseband signal processing, including Analog-to-Digital Conversion (ADC)/Digital-to-Analog Conversion (DAC), gain adjusting, modulation/demodulation, encoding/decoding, and so on. The RF device may receive RF wireless signals via the antenna, convert the received RF wireless signals into baseband signals, which are processed by the baseband processing device, or receive baseband signals from the baseband processing device and convert the received baseband signals into RF wireless signals, which are later transmitted via the antenna. The RF device may also contain multiple hardware components to perform radio frequency conversion. For example, the RF device may comprise a mixer to multiply the baseband signals with a carrier oscillated in the radio frequency of the supported wireless technologies, wherein the radio frequency may be 2.4 GHz, 3.6 GHz, 4.9 GHz, or 5 GHz utilized in the WiFi technology, or another radio frequency, depending on the wireless technology in use.

Figure 3:
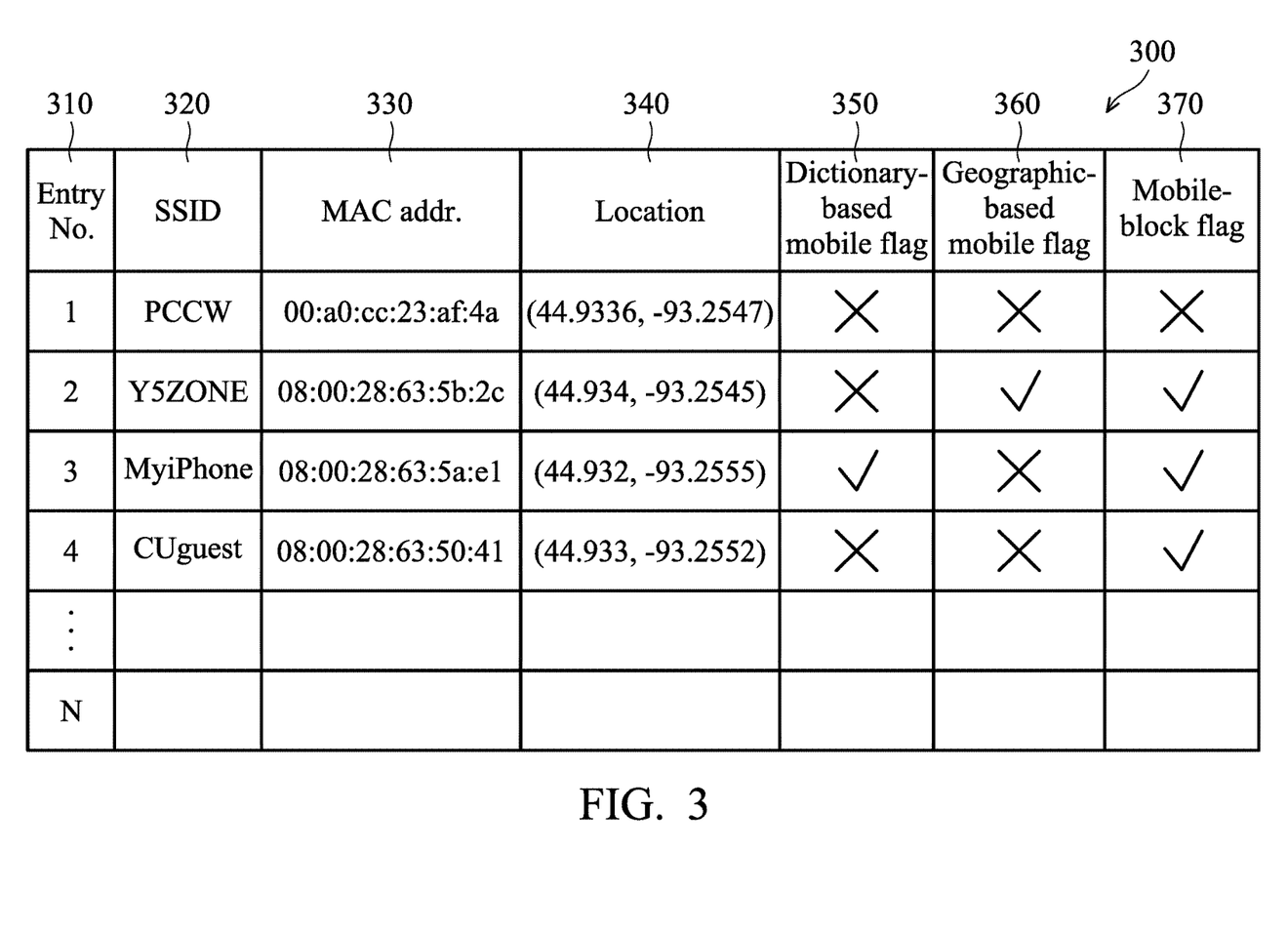
FIG. 3 is an exemplary diagram illustrating a database of known APs according to an embodiment of the application.

FIG. 3 is an exemplary diagram illustrating a database of known APs according to an embodiment of the application. The database 300 is shown in a table format which includes data fields: an Entry Number 310, an SSID 320, a MAC address 330, a GPS location 340, a Dictionary-based mobile flag 350, a Geographic-based mobile flag 360, and a mobile-block flag 370. The Entry Number 310 indicates the number of each entry of AP in the database 300. The SSID 320 stores the SSID of each known AP. The MAC address 330 stores the MAC address of each known AP. The GPS location 340 stores the GPS location of each known AP, in a pair of GPS latitude and GPS longitude specified by degrees. The Dictionary-based mobile flag 350 indicates whether an AP is identified as a mobile AP by checking if its SSID matches a predetermined naming pattern. The Geographic-based mobile flag 360 indicates whether an AP is identified as a mobile AP by checking if its GPS location has been updated with a location change across a predetermined distance, e.g., 500 meters. The mobile-block flag 370 indicates whether the MAC address of an AP falls within a MAC address block which is estimated to be dedicated to mobile devices.

As shown in FIG. 3, the geographic-based mobile flag of the second entry is set because the GPS location of the AP has been updated with a new location far away from the previously recorded location, and the dictionary-based mobile flag of the third entry is set because the SSID of the AP matches a predetermined naming pattern—"iPhone". With either the geographic-based mobile flag or the dictionary-based mobile flag being set, the corresponding AP may be identified as mobile AP. Note that the MAC addresses of the second to fourth entries are within the same MAC address block with the same first 9 digits. That is, there are three APs in the same MAC address block, and two of them are identified as mobile APs. Assuming that the ratio of the number of mobile APs in this MAC address block (i.e., 2 in this embodiment) to the total number of APs in this MAC address block (i.e., 3 in this embodiment) exceeds a predetermined threshold (e.g., say 0.1 or 0.2), all APs in this MAC address block are classified as mobile APs and their mobile-block flags are set accordingly, as shown in FIG. 3.

Figure 4:
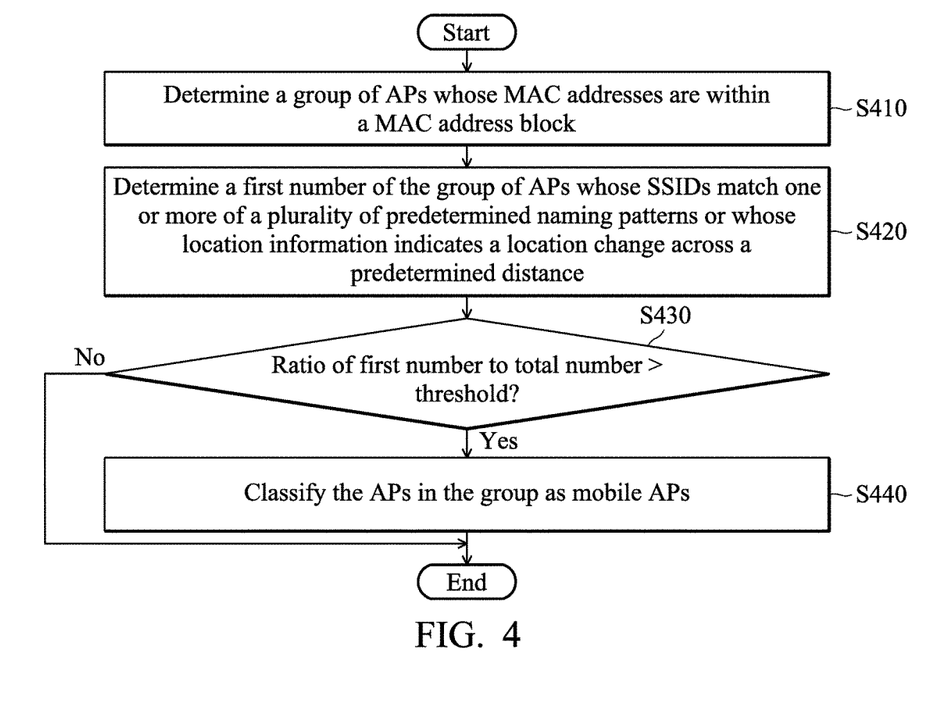
FIG. 4 is a flow chart illustrating the method for a mobile positioning system to identify mobile APs according to an embodiment of the application.

FIG. 4 is a flow chart illustrating the method for a mobile positioning system to identify mobile APs according to an embodiment of the application. In this embodiment, the method is applied to and executed by a computer system which is configured to operate as a mobile positioning system, e.g., the mobile positioning system 150. To begin, the mobile positioning system determines, from a database, a group of APs whose MAC addresses are within a MAC address block (step S410), wherein the database stores the SSIDs, location information, and MAC addresses of a plurality of known APs. The MAC address block is comprised of MAC addresses with a predetermined number of digits starting from the head being the same. For example, the MAC addresses have the same first 'x' digits, where a typical value of 'x' is 9.

In one embodiment, the mobile positioning system may first harvest a number of Wi-Fi APs to establish the database. For example, extra devices may be sent to detect or observe wireless beacons, collect the SSIDs and MAC addresses in the wireless beacons, and record the locations from which the detections or observations were made into the database. Alternatively, the information of the APs may be harvested by crowd-sourcing.

Next, the mobile positioning system determines a first number of the group of APs whose SSIDs match one or more of a plurality of predetermined naming patterns or whose location information indicates a location change across a predetermined distance (step S420).

In one embodiment, the mobile positioning system may set the dictionary-based mobile flags in the database, which are corresponding to the group of APs whose SSIDs match one or more of the predetermined naming patterns, and also set the geographic-based mobile flags in the database, which are corresponding to the group of APs whose location information indicates a location change across the predetermined distance.

Specifically, the predetermined naming pattern indicates names of mobile device companies, mobile device models, mobile device Operating Systems (OSs), or mobile installation environments. For example, the predetermined naming pattern may be represented with the following mobile dictionary terms in regular expression format. ^alcatel one touch.*, ^gplus.*, ^huawei-e5220.*, ^huawei-e533[06].*, ^huawei-e537[257].*, ^huawei-e573[06].*, ^infocus.*, ^iphone.*, ^mf6[05]_ .*, ^mf910_.*, ^mifi935_.*, ^102.*, ^oppo.*, ^mf283.*, ^mf970.*, ^meizu.*, ^mf65\+.*, ^coolpad.*, ^y5bus.*, ^mt7-109.*, ^andromax.*, ^huawei-e5776.*, ^huawei-e5573.*, ^mivue.*, ^tp-link_pocket.*, ^acer liquid.* .*ipad$, .*iphone$, .*phone$, .*mf60$, .*mf910$, .*my asus$, .*tpe-free bus$ ^myasus$, ^ibus-free$ .*android.*, .*blackberry.*, .*htc.*, .*lumia.*, .*mobile.*, .*portable.*, .*xperia.*, .*macbook.*

Note that "alcatel", "gplus", "huawei", "infocus", "iphone", "mifi", "oppo", "mf", "meizu", "coolpad", "mt", "andromax", "mivue", "tp-link", "acer", "asus", "blackberry", "htc", "lumia" are names of mobile device companies. The numbers subsequent to the company names, and keywords, such as "iphone", "ipad", "macbook", and "xperia", are device model names. "android" is the name of a mobile device OS. In addition, there are keywords, such as "portable", "tpe-free bus", and "ibus", from which it may be explicitly inferred that the AP is a mobile AP or is installed in a mobile vehicle (i.e., bus). In addition, note that default SSIDs of mobile APs usually contain identifiable keywords, such as "Android", "Xperia", and "huawei-e5776". However, some users may change their device SSIDs, causing the APs unable to be identified as mobile APs based on their SSID context. While many users may change SSID from the factory assignment, as long as we can identify few APs in a MAC address block, whose SSID contain factory-assigned keywords, we can safely say that this MAC address block has been assigned to mobile devices.

After that, the mobile positioning system determines whether the ratio of the first number to the total number of the group of APs exceeds a predetermined threshold (step S430), and if so, classifies the APs in the group as mobile APs (step 440), and the method ends. In one embodiment, the APs in the group may be classified as mobile APs by setting the mobile-block flags of the group of APs in the database. Otherwise, if the ratio does not exceed the predetermined threshold, the method ends.

Alternatively, subsequent to steps S440 and the 'No' branch of step S430, the process may return to step S410 to pick another MAC address block to repeat the method, until all MAC address blocks are examined.

For illustration purposes, the number of known APs in the MAC address block, which are identified as mobile APs according to their SSID context, but not according to their geographic context, may be represented as N1. The number of known APs in the MAC address block, which are identified as mobile APs according to their geographic context, but not according to their SSID context, may be represented as N2. The number of know APs in the MAC address block, which are identified as mobile APs according to their SSID context and their geographic context, may be represented as N3. The sum of N1, N2, and N3 may be taken as the first number in step S420. Let the total number of known APs in the MAC address block be M. That is, M may be taken as the total number in step S430.

Take a predetermined threshold in step S430 of 0.1 as an example, as long as $$\frac{N1+N2+N3}{M} > 0.1,$$

it may be inferred that all the known APs in the MAC address block are mobile APs because the Institute of Electrical and Electronics Engineers (IEEE) allocates and distributes MAC addresses to manufacturers/vendors in contiguous blocks. Examples of MAC addresses blocks which are assigned to mobile device manufacturers/vendors are as follows.

| MAC address block | manufacturer/vendor |
| --- | --- |
| 30:a8:db:cf:bx:xx | Sony Mobile |
| d0:22:be:c1:6x:xx | Samsung Electro |
| 00:ee:bd:f1:5x:xx | HTC Corporation |
| 3c:47:11:bf:0x:xx | Huawei Technology |

Note that 'x' in the exemplary MAC addresses covers any value of a hexadecimal number.

Figure 5:
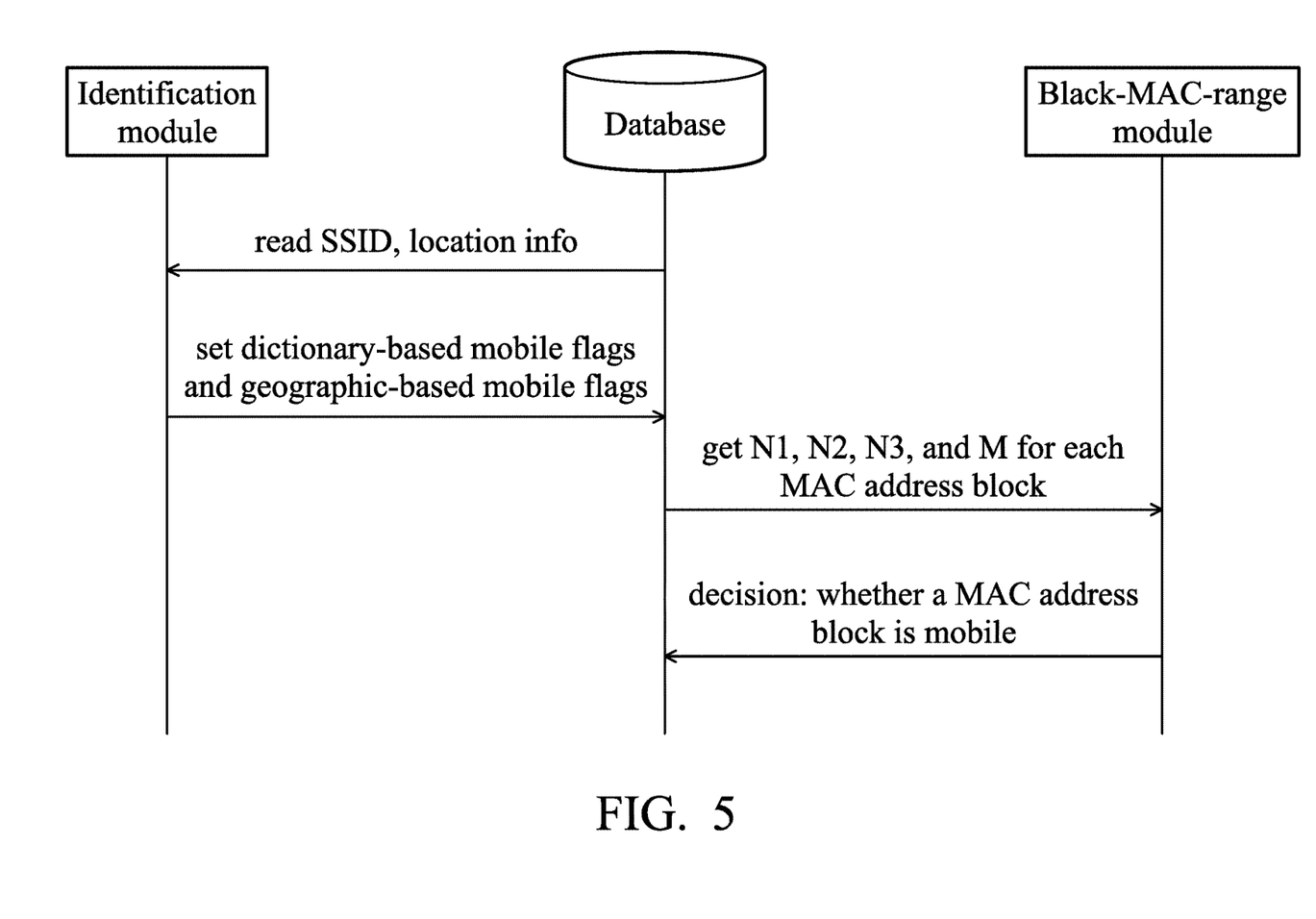
FIG. 5 is an exemplary diagram illustrating an implementation view of the method for a mobile positioning system to identify mobile APs according to an embodiment of the application.

FIG. 5 is an exemplary diagram illustrating an implementation view of the method for a mobile positioning system to identify mobile APs according to an embodiment of the application.

The identification module is responsible for identifying mobile APs in the database according to their SSID and location information, as mentioned in step S420. Specifically, the identification module updates the dictionary-based mobile flags and/or geographic-based mobile flags in the database when the corresponding APs are identified as mobile APs based on their SSID or location context.

The black-MAC-range module is responsible for retrieving and analyzing the information stored in the database, to decide whether a MAC address block should be marked as a mobile block. The decision made by the black-MAC-range module is sent back to update the database. Specifically, the mobile-block flags in the database are set when the MAC address block which the MAC addresses of the APs fall within is a mobile block.

In one embodiment, the identification module and the black-MAC-range module may be realized with instructions or program code and executed by a processor or controller. The database may be maintained in a computer readable non-transitory storage medium, such as a hard disk or memory.

In view of the forgoing embodiments, it should be appreciated that the present application realizes efficient exclusion of mobile APs in a database for mobile positioning, by utilizing the characteristic of MAC addresses generally being allocated and distributed to manufacturers in contiguous blocks and analyzing the SSIDs and location information of the APs within a MAC address block. Advantageously, mobile APs, including those with SSIDs that have changed from the default value, may be efficiently identified from a large scale of AP data in the database.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A computer system, comprising:
a storage device configured to store Service Set Identifiers (SSIDs), location information, and Media Access Control (MAC) addresses of a plurality of Access Points (APs); and
a controller configured to determine a group of APs among the APs, whose MAC addresses are within a MAC address block, determine a first number of the group of APs whose SSIDs match one or more of a plurality of predetermined naming patterns or whose location information indicates a location change across a predetermined distance, determine whether a ratio of the first number to a total number of the group of APs exceeds a predetermined threshold, and classify the APs in the group as mobile APs when the ratio exceeds the predetermined threshold.

2. The computer system as claimed in claim 1, wherein the storage device is further configured to store a respective mobile-block flag for each of the APs, and the controller is further configured to set the mobile-block flags of the group of APs.

3. The computer system as claimed in claim 1, wherein the storage device is further configured to store a respective dictionary-based mobile flag for each of the APs, and the controller is further configured to set the dictionary-based mobile flags of the group of APs whose SSIDs match one or more of the predetermined naming patterns.

4. The computer system as claimed in claim 1, wherein the storage device is further configured to store a respective geographic-based mobile flag for each of the APs, and the controller is further configured to set the geographic-based mobile flags of the group of APs whose location information indicates the location change across the predetermined distance.

5. The computer system as claimed in claim 1, wherein the predetermined naming patterns indicate names of mobile device companies, mobile device models, or mobile device Operating Systems (OSs).

6. The computer system as claimed in claim 1, wherein the MAC address block is comprised of MAC addresses with a predetermined number of digits starting from the head being the same.

7. The computer system as claimed in claim 1, wherein the controller is further configured to exclude the group of APs when processing a request for mobile positioning.

8. A method for a mobile positioning system to identify mobile Access Points (APs), the method comprising:
determining a group of APs whose MAC addresses are within a MAC address block;
determining a first number of the group of APs whose SSIDs match one or more of a plurality of predetermined naming patterns or whose location information indicates a location change across a predetermined distance;
determining whether a ratio of the first number to a total number of the group of APs exceeds a predetermined threshold; and
classifying the APs in the group as mobile APs when the ratio exceeds the predetermined threshold.

9. The method as claimed in claim 8, further comprising:
storing the SSIDs, the location information, the MAC addresses, and mobile-block flags of the APs; and
setting the mobile-block flags of the group of APs.

10. The method as claimed in claim 8, further comprising:
storing the SSIDs, the location information, the MAC addresses, and dictionary-based mobile flags of the APs; and
setting the dictionary-based mobile flags of the group of APs whose SSIDs match one or more of the predetermined naming patterns.

11. The method as claimed in claim 8, further comprising:
storing the SSIDs, the location information, the MAC addresses, and geographic-based mobile flags of the APs; and
setting the geographic-based mobile flags of the group of APs whose location information indicates the location change across the predetermined distance.

12. The method as claimed in claim 8, wherein the predetermined naming patterns indicate names of mobile device companies, mobile device models, or mobile device OSs.

13. The method as claimed in claim 8, wherein the MAC address block is comprised of MAC addresses with a predetermined number of digits starting from the head being the same.

14. The method as claimed in claim 8, further comprising:
excluding the group of APs when processing a request for mobile positioning.

15. A product comprising one or more computer readable non-transitory storage media comprising computer-executable instructions which, when executed by at least one processor logic, enable the at least one processor logic to:
determine a group of APs whose MAC addresses are within a MAC address block;
determine a first number of the group of APs whose SSIDs match one or more of a plurality of predetermined naming patterns or whose location information indicates a location change across a predetermined distance;
determine whether a ratio of the first number to a total number of the group of APs exceeds a predetermined threshold; and
classify the APs in the group as mobile APs when the ratio exceeds the predetermined threshold.

16. The product as claimed in claim 15, wherein the computer-executable instructions, when executed by the at least one processor logic, further enable the at least one processor logic to:
set mobile-block flags corresponding to the group of APs in a database.

17. The product as claimed in claim 15, wherein the computer-executable instructions, when executed by the at least one processor logic, further enable the at least one processor logic to:
set dictionary-based mobile flags, corresponding to the group of APs whose SSIDs match one or more of the predetermined naming patterns, in a database.

18. The product as claimed in claim 15, wherein the computer-executable instructions, when executed by the at least one processor logic, further enable the at least one processor logic to:
set geographic-based mobile flags, corresponding to the group of APs whose location information indicates the location change across the predetermined distance, in a database.

19. The product as claimed in claim 15, wherein the predetermined naming patterns indicate names of mobile device companies, mobile device models, or mobile device OSs.

20. The product as claimed in claim 15, wherein the MAC address block is comprised of MAC addresses with a predetermined number of digits starting from the head being the same.

21. The product as claimed in claim 15, wherein the computer-executable instructions, when executed by the at least one processor logic, further enable the at least one processor logic to:
exclude the group of APs when processing a request for mobile positioning.

* * * * *